United States Patent

[11] 3,561,600

[72] Inventor Ken-Ichiro Kurita
 36-4, 5 chome Senriyama-nishi, Suita, Osaka Prefecture, Japan
[21] Appl. No. 002,268
[22] Filed Jan. 12, 1970
[45] Patented Feb. 9, 1971

[54] FILTER PRESS OF PLATE-AND-FRAME TYPE
 12 Claims, 7 Drawing Figs.
[52] U.S. Cl. .................................................. 210/225,
 210/228, 210/230, 210/236
[51] Int. Cl. ..................................................... B01j 25/34
[50] Field of Search ............................................. 210/224,
 225, 227, 228, 230; 100/198

[56] References Cited
UNITED STATES PATENTS
| 699,052 | 4/1902 | Wilson | 210/227 |
|---|---|---|---|
| 3,289,844 | 12/1966 | Emele | 210/225 |
| 3,333,702 | 8/1967 | Muller | 210/230 |
| 3,347,384 | 10/1967 | Muller | 210/230X |
| 3,366,243 | 1/1968 | Kurita | 210/225 |

FOREIGN PATENTS
| 1,200,258 | 9/1965 | Germany | 210/225 |

Primary Examiner—Reuben Friedman
Assistant Examiner—C. M. Ditlow
Attorney—McCarthy, Depaoli and O'Brien ABSTRACT: A filter press is of a type which comprises filter plates and filter frames alternately arranged between a stationary end plate and a movable end plate with filtering cloth disposed between the filter plates and filter frames facing each other, the filtering elements being adapted to be pressed together by the movable end plate for filtration, the filter plates being adapted to be separated from the filter frames for the removal of cake. Each frame unit comprises two filter frames hingedly connected together at their upper portions and adapted to be opened in inverted V-shape. The lower portions of the frames are respectively connected to the lower opposite sides of the adjacent plates by means of links. When one filter plate is released, the following frame unit is opened to allow the cake to drop automatically from the cake chamber in the unit.

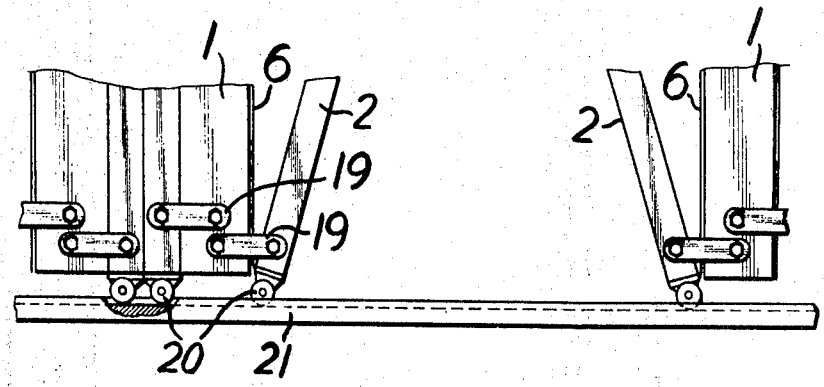
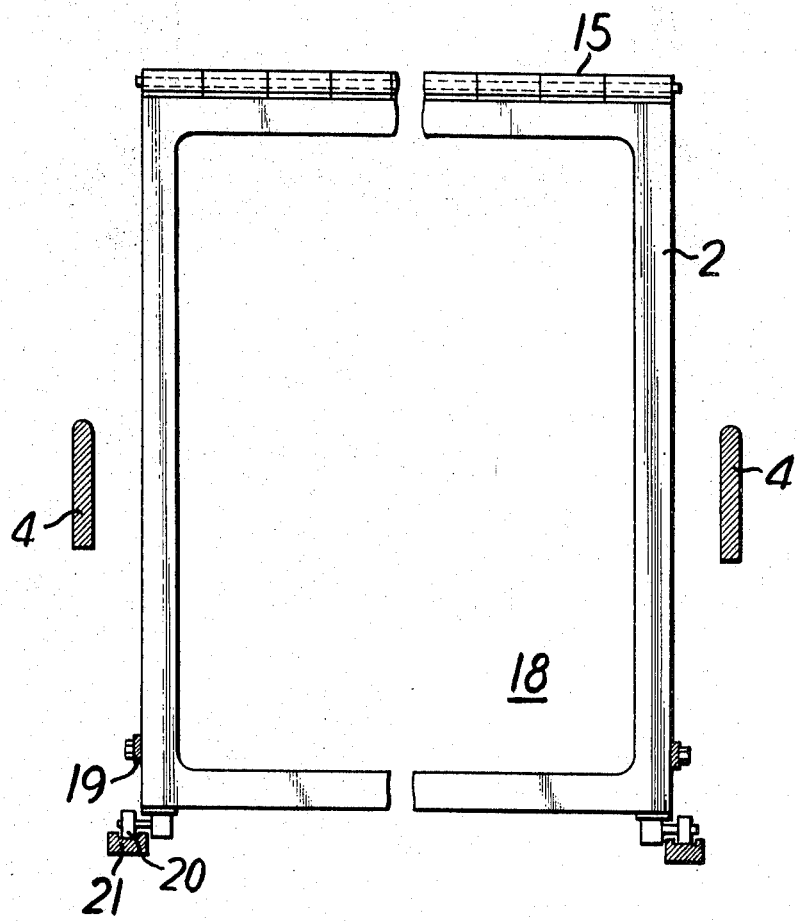

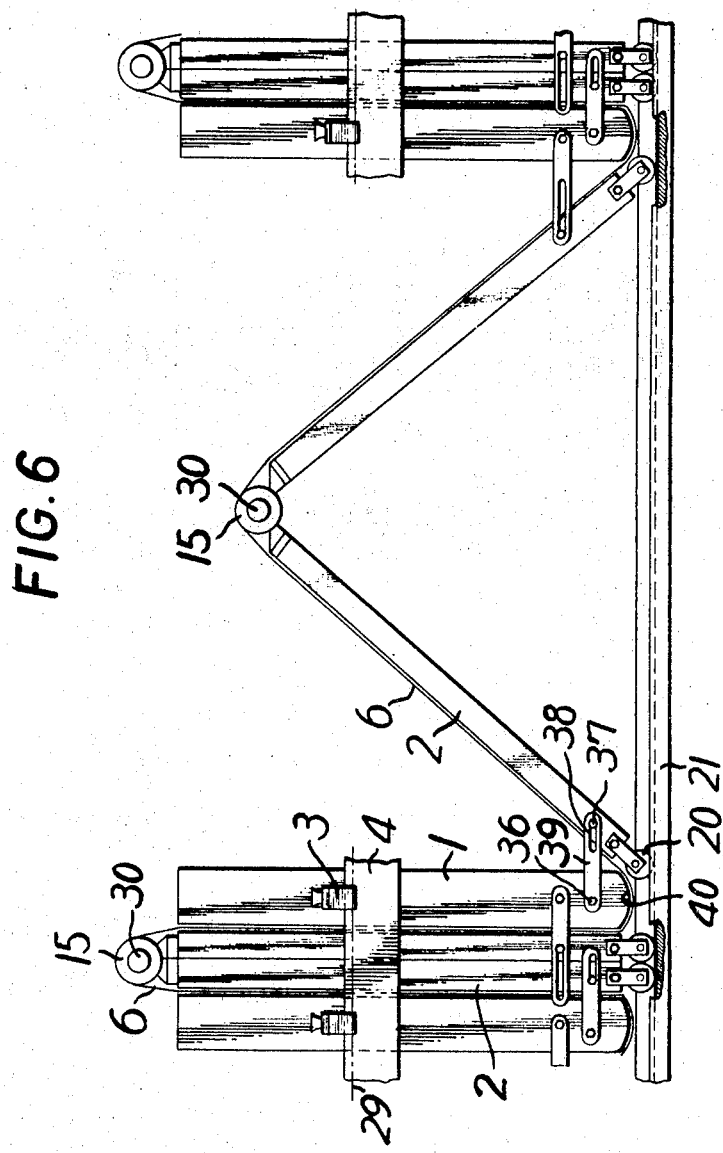

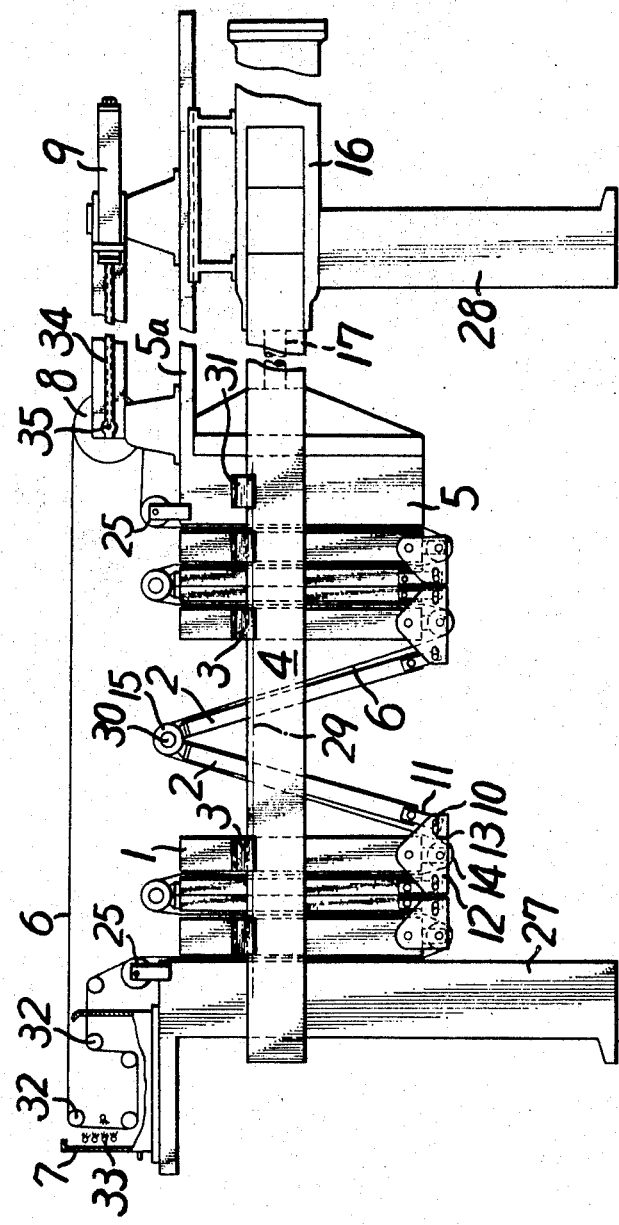

FILTER PRESS OF PLATE-AND-FRAME TYPE

BACKGROUND OF THE INVENTION

The present invention relates to a filter press of plate-and-frame type provided with an apparatus for automatically removing filter cake.

In general, a filter press of plate-and-frame type comprises filter plates and filter frames alternately arranged in a row and filter cake is accumulated in the interiors of the frames by means of filter cloth covering the surfaces of the frames, the filter plates being adapted to be separated from the frames to remove the cake from the filter cloth. Such apparatus is proposed, for example, by U.S. Pat. Nos. 3,289,844 and 3,366,244. In the case of filter cake of high viscosity, however, it is difficult to force the cake to release from the interiors of the frames automatically; a drawback causing a great difficulty in achieving automatic filtration in filter presses of plate-and-frame type.

An object of the present invention is to provide an apparatus to be used in a filter press of plate-and-frame type by which, when one filter plate is transported in cake releasing procedure, the following filter frame unit is automatically separated into open position so as to allow the cake to drop from the interior of the frame unit, the apparatus thus being capable of effecting automatic removal of the cake and facilitating filtering operation.

SUMMARY OF THE INVENTION

An object of the present invention is to provide a filter press in which a filter frame unit disposed between each two adjacent filter plates is formed of separate filter frames having open interiors and hingedly connected at their upper portions, the lower portions of the frames being pivotally connected to the lower portions of the adjacent filter plates by means of suitable members, and a continuous filter cloth is so provided as to cover both faces of each plate and the external faces of each frame unit, the structure being such that when the plate is moved the frame unit may be brought into an open position in inversed V-shaped between the moved plate and the following adjacent plate still in fixed position.

Another object of the present invention is to provide a filter press in which filter cloth is passed over guide rollers disposed at the lower portions of respective plates and over guide rollers mounted on the upper portions of respective filter frame units so that the cloth may be extended along all of the plates and frames continuously in zigzag manner, the cloth further being passed over a tension roller and guide rollers in a washing vessel mounted on the machine frame in endless fashion so as to facilitate washing of the filter cloth.

In accordance with the present invention, the movement of the one filter plate forces the following filter frame unit to separate into open position and allows filter cake to drop automatically. Automatic filtering operation which was conventionally unavailable has been achieved with ease.

BRIEF DESCRIPTION OF THE DRAWINGS

FIG. 4 is a side elevation showing an embodiment provided with separate sheets of filter cloth and rails for supporting filter frames;

FIG. 5 is a front view of FIG. 4;

FIG. 6 is a side elevation showing a modified embodiment employing a continuous cloth, and FIG. 7 is a side elevation of an embodiment provided with means for washing filter cloth.

DETAILED DESCRIPTION OF THE PREFERRED EMBODIMENTS

Figure 1:
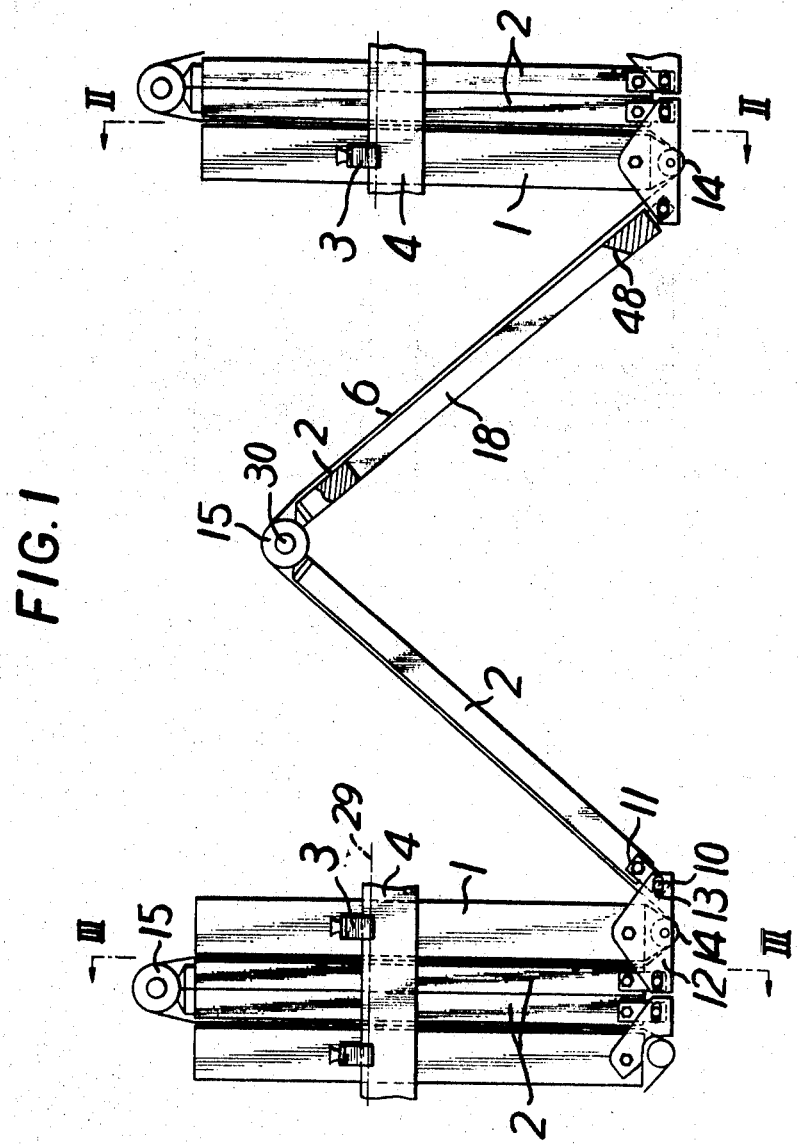
FIG. 1 is a side elevation showing an embodiment of the present invention.

Referring to FIG. 1, designated at 1 are filter plates and at 2, a filter frame unit of the present invention which comprises filter frames hingedly connected with each other at the upper portions by a pin 30 in inverted V-shaped form. At the lower portions of the frame unit, pins 10 attached to the holding members 11 are engaged with slots 13 formed in support members 12 fixed to the opposite sides of the lower portions of the plates 1. Designated at 4 are side bars already known in the art and disposed parallel to the opposite sides of a group of filter plates 1 and frames 2, both ends of the bars being respectively supported on a machine frame (not shown). Numeral 3 indicates arms secured to the opposite sides of the plate 1 and movably mounted on the pair of the side bars 4. As shown in FIG. 1 in section and in FIG. 2, the frames 2 are formed with cavities serving as cake chambers 18 for receiving the cake. Filter cloth 6 in the embodiment in FIG. 1 is provided over the upper hinge 15 of the frame unit 2 and passed under a guide roller 14 attached to the lower portion of the plate 1 to extend over the hinge 15 of the adjacent frame unit 2. However, as will be described later, it is not necessarily required that the cloth 6 extend over the adjacent frame unit 2.

Figure 2:
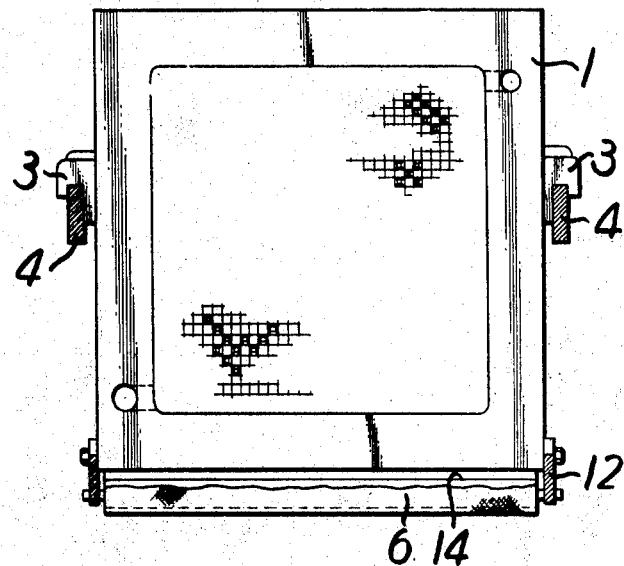
FIG. 2 is a front view taken along the line II–II in FIG. 1.
Figure 3:
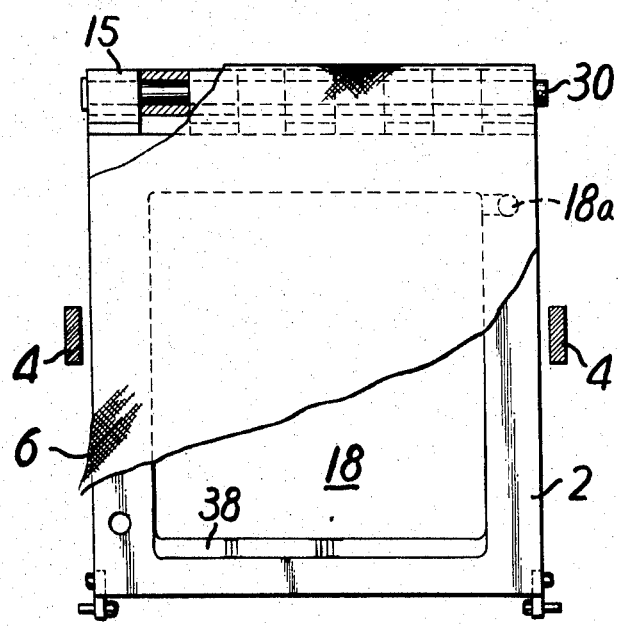
FIG. 3 is a front view taken along the line III–III in FIG. 1.

When the filter plates 1 spaced apart as shown in FIGS. 1 to 3 are brought closer toward each other by pressing means, 3 namely by a hydraulic movable head plate to press to cloth on the both faces of the plates 1 against the external faces of the frames units 2, a liquid to be filtered is forced in through inlets 18a in the frame units 2 for filtration and cake is accumulated in the cake chambers 18. When one plate 1 is separated by known transport means as by a chain 29 after filtering operation, one end of the frame unit 2 connected by the pin 10 to the support member 12 fixed to the lower end of the plate 1 is moved in the direction of separation of the plate 1, so that as shown in FIG. 1 the frame unit 2 is separated in inverted V-shaped form to allow the cake deposited in the frame unit 2 to drop due to its own weight. In this manner, automatic removal of cake in accordance with the present invention is effected. The lower portion of the frame defining the cake chamber 18 of the unit 2 is formed as a desired slanting plane 48 as shown in FIG. 1 to facilitate release of cake.

FIGS. 4 and 5 illustrate an embodiment in which filter cloth 6 is attached to the external face of the plate 1 in stationary manner. Cake drops automatically when the frame unit 2 is opened, although the cloth 6 remains in the vertical position. The embodiment in FIG. 4 further includes a different structure for supporting the under end of the frame unit 2. The opposite sides of the lower portion of the frame unit 2 and the opposite lower sides of the plate 1 are connected by links 19 and the rollers 20 disposed at the opposite lower ends of the frame unit 2 are positioned on support rail members 21 provided in parallel to the opposite lower sides of the plates. In accordance with this embodiment, the weight of several frames which support heavy cake is not loaded on the side bars 4 and therefore the side bars need not be strong.

In the embodiment shown in FIG. 6, the link shown in FIG. 4 and connecting the lower ends of the plate and frame is loosely linked at one end. A pin 37 attached to each of the opposite lower sides of the frame unit 2 is associated with a slot 38 formed at one end of link 39 which is connected at the other end to the lower end of the plate 1 by a pin 36. This embodiment permits cake to drop with greater ease since the plates 1 can be separated by a greater distance.

According to one mode of the present invention in which the cloth 6 is provided externally along the plates 1 and filter frame units 2 in zigzag manner, the lower portions of the plates 1 are formed in semicircular shape 40 as shown in FIG. 6 to pass the filter cloth over the semicircular portions. The filter cloth 6, when disposed in this manner, can be taken up by unillustrated winding means from one end for the exchange of the cloth, and if a new cloth is joined with the other end, exchange of the cloth can be readily made.

In the embodiment shown in FIG. 7, filter cloth is renewed by washing. The cloth 6 endless and part of the cloth passes through a washing vessel 7 positioned on a machine frame 27. Designated at 32 are guided rollers for passing part of the filter cloth 6 through the washing vessel. Washing nozzles 33 disposed in the washing vessel 7 are directed to the front and back faces of the cloth 6. A tension pulley 8 serves to impart tension to the cloth 6. Numeral 9 indicates cylinders provided along the both sides for adjusting tension, the respective rods 34 of the cylinders supporting the opposite ends of a rotary shaft 35 of the tension pulley 8. The tension pulley 8, as well as the adjusting cylinders 9, is mounted on the rear extension 5a of a movable end plate 5 and adapted to the moved in accordance with the movement of the movable end plate 5 while it is adjusted by the cylinders 9. Filter cloth guide rollers 25 are mounted on the frame 27 and the movable end plate 5 respectively.

The operation of the embodiment shown in FIG. 7 will be described. The filter plates 1 and filter frame units 2 are compresses by a hydraulic cylinder 16 and after filtration the filtrate flows toward plates 1 to be discharged outward. Filter cake fills the cavities 18 formed in the frames 2. After filtration, the plates 1 are separated one by one and moved toward the retracted movable end plate 15 intermittently by means of transport chains 29, so that each pair of the frames 2 is brought into open position in inversed V-shaped between the moved filter plate 1 and the adjacent plate 1 still in fixed position, whereupon the cake is automatically dropped from the cake chambers 18 in the frames 2. The support pin 10 need not be attached to the holding member 11 as already described, but it may be attached directly to the lower side portion of the frame 2. To renew the filter cloth, the tension roller 8 is driven by the hand or a motor to send the cloth into the washing vessel 7 where it is cleaned for reuse.

I claim:

1. In a filter press of plate-and-frame type comprising filter plates and filter frames alternately arranged between a stationary end plate and a movable end plate with filter cloth disposed between the adjacent faces of said filter plates and filter frames, said filter plates and filter frames being adapted to be pressed together by said movable end plate for filtration, said filter plates being adapted to be separated from said filter frames after filtration, a structure comprising filter frame units each of which is formed of two filter frames having cavities in the interiors thereof and hingedly connected together at their upper portions so as to be opened in inverted V-form, the lower opposite sides of said frames being respectively connected to the lower opposite sides of the adjacent filter plates by means of links.

2. The filter press of plate-and-frame type as claimed in claim 1 wherein pins on holding members attached to the lower opposite sides of the each filter frame of said filter frame unit are engaged with holes in support members fixed to the lower portions of the adjacent filter plate.

3. The filter press of plate-and-frame type as claimed in claim 1 wherein the lower opposite sides of each filter frame of said filter frame unit are connected to the opposite sides of the adjacent filter plate by means of lateral links and rollers attached to the lower end of each filter frame are supported on rails provided along the opposite sides of the filter press in its longitudinal direction.

4. The filter press of plate-and-frame type as claimed in claim 3 wherein in a pin attached to each of the lower opposite sides of said filter frame is engaged with a lateral slot at one end of a link connected at the other end to each of the lower opposite sides of said filter plate.

5. The filter press of plate-and-frame type as claimed in claim 1 wherein filter cloth is disposed in parallel to the faces of said filter plates.

6. The filter press of plate-and-frame type as claimed in claim 1 wherein filter cloth is passed over the outer peripheral surfaces of upper hinges on said filter frame units and over guide rollers provided at the lower portions of said filter plates in zigzag manner.

7. The filter press of plate-and-frame type as claimed in claim 1 wherein filter cloth is passed over the outer peripheral surfaces of upper hinges on said filter frame units and over semicircular portions provided at the lower portions of said filter plates in zigzag manner.

8. In a filter press of plate-and-frame type comprising filter plates and filter frames alternately arranged between a stationary end plate and a movable end plate with filter cloth disposed between the adjacent faces of said filter plates and filter frames, said filter plates and filter frames being adapted to be pressed together by said movable end plate for filtration, said filter plates being adapted to be separated from said filter frames after filtration, a structure comprising filter frame units each of which is formed of two filter frames having cavities in the interiors thereof and hingedly connected together at their upper portions so as to be opened in inverted V-form, the lower opposite sides of said frame being respectively linked to the lower opposite sides of the adjacent filter plates, filter cloth being passed over an upper hinge of said filter frame unit and a guide member at the lower portion of the adjacent filter plate in zigzag manner so that the whole filter cloth may be moved.

9. The filter press of plate-and-frame type as claimed in claim 8 wherein said guide member for the filter cloth is a slippery semicircular portion formed on the under face of each of said filter plates.

10. The filter press of plate-and-frame type as claimed in claim 8 wherein said guide member for the filter cloth is a guide roller.

11. The filter press of plate-and-frame type as claimed in claim 8 wherein said filter cloth is extended over guide rollers mounted on the upper portion of a stationary machine frame and on the upper portion of said movable end plate respectively to be passed through a washing vessel and over a filter cloth tension means in endless manner.

12. The filter press of plate-and-frame type as claimed in claim 11 wherein said filter cloth tension means is adapted to be slidably moved on said movable end plate by hydraulic means.